United States Patent [19]

Haack

[11] Patent Number: 4,841,766
[45] Date of Patent: Jun. 27, 1989

[54] METHOD AND APPARATUS FOR CHECKING THE CONCENTRICITY OF A PNEUMATIC VEHICLE TIRE

[75] Inventor: Dietmar Haack, Springe, Fed. Rep. of Germany

[73] Assignee: Continental Aktiengesellschaft, Fed. Rep. of Germany

[21] Appl. No.: 245,819

[22] Filed: Sep. 16, 1988

[30] Foreign Application Priority Data

Sep. 23, 1987 [DE] Fed. Rep. of Germany ....... 3731924

[51] Int. Cl.⁴ .......................................... G01M 17/02
[52] U.S. Cl. ..................................................... 73/146
[58] Field of Search ................................ 73/146, 7, 8; 152/DIG. 20; 157/1, 1.1, 1.35

[56] References Cited

U.S. PATENT DOCUMENTS

4,563,042  1/1986  Seitz et al. ................. 152/DIG. 20
4,630,662 12/1986  Howind ...................... 152/DIG. 20

FOREIGN PATENT DOCUMENTS

3541188 5/1987 Fed. Rep. of Germany ........ 73/146
3604023 8/1987 Fed. Rep. of Germany ........ 73/146

*Primary Examiner*—Donald O. Woodiel
*Attorney, Agent, or Firm*—Becker & Becker, Inc.

[57] ABSTRACT

A method and apparatus for checking the concentricity of a pneumatic vehicle tire that during operation has its beam portions mounted on the radially inner periphery of a wheel rim. The apparatus includes a two-part test rim, the two rim ring sections of which are axially movable. Disposed against the test rim is a tire that is to be checked, with this tire being manufactured with trapezoidally axially outwardly directed sidewalls, and with the tire being disposed against the rim ring sections in this trapezoidal form. Bead-receiving rings are moved axially from the outside against the axially moved-apart rim ring sections. These bead-receiving rings fold-over the sidewalls and bring them, in a rim-seating position, into contact against the rim ring section. The tire is secured in position between the rim ring sections and the bead-receiving rings.

6 Claims, 1 Drawing Sheet

1

METHOD AND APPARATUS FOR CHECKING THE CONCENTRICITY OF A PNEUMATIC VEHICLE TIRE

BACKGROUND OF THE INVENTION

The present invention relates to a method and apparatus for receiving a tire, especially for measuring or checking the concentricity of a pneumatic vehicle tire that during operation has its bead portions mounted on the radially inner periphery of a wheel rim. A test rim is provided that comprises two axially movable rim ring sections that have a common rim ring and against which is disposed a tire that is to be checked, with the tire being manufactured with trapezoidally axially outwardly directed sidewalls, and with the tire being disposed against the rim ring sections in this trapezoidal form.

The concentricity of conventional tires, the beads of which are disposed on the radially outer periphery of a rim, is checked by means of a two-part test rim that is disposed against the tire from the outside. In so doing, the two test rim parts that are axially movable relative to one another receive the tire in bead-seating surfaces in the same manner as the vehicle tire is mounted during driving operation. With the newly developed tire/rim system, such as disclosed in German Offenlegungsschrift No. 30 00 428, where the beads of the tire are disposed on the radially inner periphery of the rim, the problem exists that the test rim must be introduced into the interior of the tire, although it has a greater diameter than the inner diameter of the tire.

To accomplish this, it was proposed in German Offenlegungsschrift No. 35 41 188 to construct the axially displaceable rim ring sections of several radially adjustable rim segments. In the radially drawn-together state, i.e. with a reduced diameter, such a test rim can be introduced into the tire, which has a small inner diameter, and can then be moved apart into the checking position. However, the problem with this is that the interior of the tire must be sealed off and the sidewalls of the tire must be moved out of their trapezoidal form, in which they are heated, into the mounting state.

For this reason, German patent application No. P 36 04 023.1 proposes checking the concentricity of such a tire in the position where its sidewalls and bead regions are folded laterally outwardly, i.e. in the position in which the tire is heated. However, with such an apparatus the actual operating conditions can be reproduced only to a limited extent, and one is still left with the desire to be able to check tires in their actual mounting position.

It is therefore an object of the present invention to provide a method and apparatus with which tires of the aforementioned type can be checked.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The method of the present invention is characterized primarily in that bead-receiving rings are moved axially from the outside against the axially moved-apart rim ring sections, with the bead-receiving rings folding-over the tire sidewalls and bringing them into the rim-seating position for contact against the rim ring sections, whereby the tire that is to be checked is secured in position between the rim ring sections and the bead-receiving rings.

As a result of these measures, a method is provided with which tires of the aforementioned type can be quickly and rapidly brought into their mounting position and can be checked.

The apparatus of the present invention for carrying out the inventive method is characterized primarily in that: the rim ring sections, in the region of their rim ring, are provided with laterally and axially outwardly projecting rim ring edges that have no rim flange and that merge radially inwardly via shoulder portions with inboard members; and in that inner faces of the bead-receiving rings, which faces are directed toward the rim ring sections, are provided with radially outwardly directed, circumferential retaining ribs that are adapted to be introduced axially into the regions where the shoulder portions merge with the inboard members.

As a result of these measures, an apparatus is provided with which a trapezoidally heated tire can be rapidly and easily brought into the rim-seating position. This apparatus is easy to seal off, and it can be used to check a large number of tires within a very short period of time.

Further specific features of the present invention will be described in detail subsequently.

DESCRIPTION OF PREFERRED EMBODIMENTS

Figure 1:
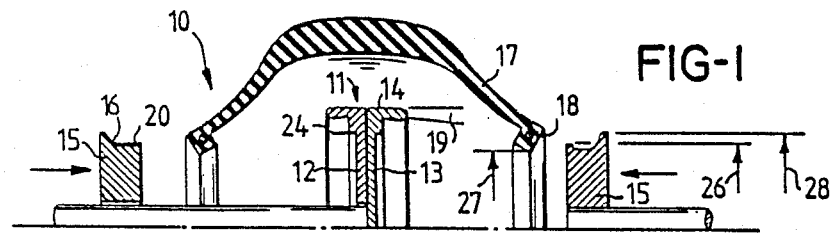
FIG. 1 is a partial cross-sectional view of one exemplary embodiment of the inventive concentricity-checking apparatus with the rim ring sections moved together and the bead-receiving rings separated or moved apart, and with a trapezoidally shaped tire.
Figure 2:
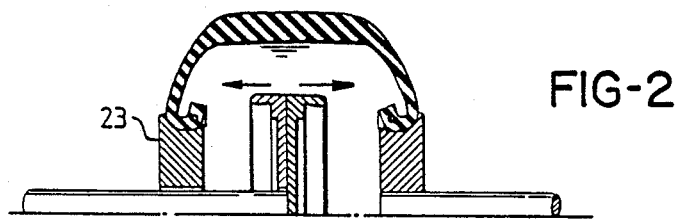
FIG. 2 shows the concentricity-checking apparatus of FIG. 1 with both the rim ring sections and the bead receiving rings moved together, and with a tire that has been folded-over into the mounting position.
Figure 3:
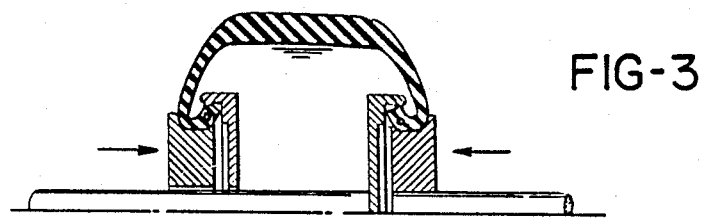
FIG. 3 shows the concentricity-checking apparatus of FIG. 1 with the rim ring sections moved apart and the bead-receiving rings moved together, with a tire that is folded-over in the mounting position.
Figure 4:
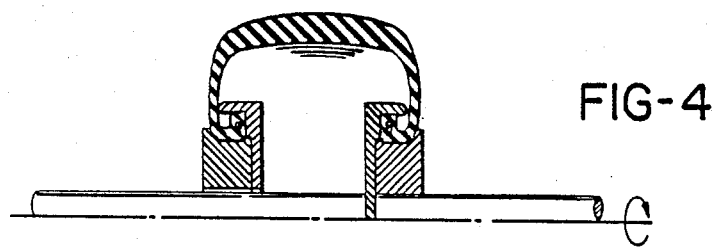
FIG. 4 shows the concentricity-checking apparatus of FIG. 1 with the rim ring sections moved apart and the bead-receiving rings moved together, with a tire being secured in position in the mounting position.

Referring now to the drawing in detail, the concentricity-checking apparatus 10 illustrated in FIGS. 1 to 4 essentially comprises a test rim 11 that has two rim ring halves or sections 12 and 13 that can be shifted axially relative to one another. In the moved-together state illustrated in FIG. 1, the radially outer surface of the rim ring sections 12 and 13 are provided with a common cylindrical rim ring 14. As shown in FIGS. 3 and 4, the rim ring sections 12 and 13 can also be moved axially to provide different open rim widths.

As shown in FIG. 1, in order to perform a check the tire 17 is placed in its trapezoidal form over the concentricity-checking apparatus 10. When the rim ring sections 12 and 13 are moved apart to the desired open rim width, as shown in FIG. 3, bead-receiving rings 15 are moved axially from beyond the tire 17 against the bead portions 18. In so doing, as shown in FIG. 2, the bead portions 18 are flipped over axially inwardly by the beadreceiving rings 15, and are pressed into their rim-seating position.

Figure 5:
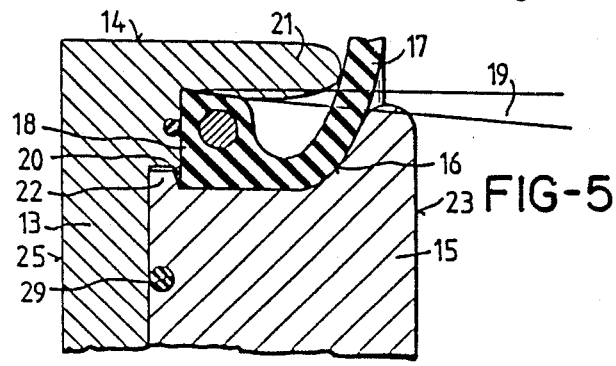
FIG. 5 is a partial, detailed, crosssectional view of the concentricity-checking apparatus of FIG. 1 with the rim ring sections moved apart and the beadreceiving rings moved together, with a tire that is secured in the mounting position between the shoulder of a rim ring and bead support.

As shown particularly clearly in FIG. 5, the bead-receiving rings 15 are provided with beadseating surfaces 16 for receiving the bead portions 18 of the tire 17. The rim ring section 12 and 13 are provided with inboard members 25 that are disposed at essentially right angles to the axisparallel cylindrical rim ring 14. The rim ring 14 has laterally projecting rim ring edges 21 via which the rim ring 14 can be brought into operative connection with the tire 17 that is to be checked. Each of the laterally projecting rim ring edges 21 is provided in the transverse direction with a radially inwardly directed slope or inclination 19 of five to fifteen degrees that merges axially inwardly with a shoulder 24 that in turn is recessed relative to the associated inboard member 25.

Each bead-receiving ring 15 is provided axially inwardly with a circumferential, radially outwardly directed retaining rib 22, the outer diameter 26 of which is such that the beadreceiving ring 15, with its retaining rib 22, can be introduced into the associated shoulder 24 and can be brought into contact with the inboard member 25.

The retaining ribs 22 are provided with inclined demounting portions 20 that are directed axially inwardly and radially outwardly from the bead-receiving rings 15. The radially outer diameter 26 of the inclined demounting portions 20 is such that these demounting portions 20, and hence the retaining ribs 22, can pass the bead portions 28 of the tire 17 when the bead-receiving rings 15 are moved together. These bead-receiving rings 15 merge axially outwardly into outboard portions 23, the diameter 28 of which is greater than the diameter 27 of the tire 17 in the region of the trapezoidal layout of the bead portions 18. As a result, when the bead-receiving rings 15 are moved together, the bead portions 18 are folded over inwardly into their rim-seating positios, and are brought into operative connection with and are secured in position by the laterally projecting rim ring edges 21 of the rim ring sections 12 and 13. Sealing members 29, which seal the interior of the tire 17 from the outside, can be provided between the bead-receiving rings 15 and the inboard members 25 of the rim ring sections 12 and 13.

The present invention is, of course, in no way restricted to the specific disclosure of the specification and drawing, but also encompasses any modifications within the scope of the appended claims.

What I claim is:

1. A method of checking the concentricity of a pneumatic vehicle tire that during operation has its bead portions mounted on the radially inner periphery of a wheel rim, said method including the use of a test rim comprised of two axially movable rim ring sections that have a common rim ring and against which is disposed a tire that is to be checked, with said tire being manufactured with trapezoidally axially outwardly directed sidewalls, and with said tire being disposed against said rim ring sections in this trapezoidal form, said method further including the step of:

while moving said rim ring sections axially apart, using bead-receiving rings to fold over said tire sidewalls, bring them into contact against said rim ring sections in a rim-seating position, and secure said tire that is to be checked in position between said rim ring sections on the one hand, and said bead-receiving rings on the other hand.

2. In an apparatus for checking the concentricity of a pneumatic vehicle tire that during operation has its bead portions mounted on the radially inner periphery of a wheel rim, said apparatus including a test rim comprised of two axially movable rim ring sections that have a common rim ring and against which is disposed a tire that is to be checked, with said tire being manufactured with trapezoidally axially outwardly directed sidewalls, and with said tire being disposed against said rim ring sections in this trapezoidal form, the improvement comprising:

rim ring sections that are each provided, in the region of said rim ring, with a laterally and axially outwardly projecting rim ring edge that has no rim flange and that merges radially inwardly via a shoulder portion with an inboard member; and two axially movable bead-receiving rings, each of which is disposed axially outwardly of one of said rim rings sections and has a portion that faces said rim ring section and is provided with a radially outwardly directed, circumferential retaining rib that is adapted to be introduced axially into the region where said shoulder portion merges with said inboard member, whereby said tire is held in position between said bead-receiving rings on the one hand, and said rim ring sections on the other hand.

3. An apparatus according to claim 2, in which, when viewed in a radial cross-section, each of said axially movable rim ring sections, in the vicinity of said rim ring edge, has an inclined surface that is inclined radially inwardly, in a direction axially outwardly away from said shoulder portion, by about from five to fifteen degrees.

4. An apparatus according to claim 3, in which said axially movable bead-receiving rings, in the vicinity of said retaining ribs, are provided with demounting portions that are inclined in a radially outward direction.

5. An apparatus according to claim 3, in which said bead-receiving rings are provided with sealing means to seal them relative to said inboard members.

6. An apparatus according to claim 3, in which said test rim is embodied as a rotatable rim upon which a tire can be disposed during production and checking.

* * * * *